Patented July 14, 1931

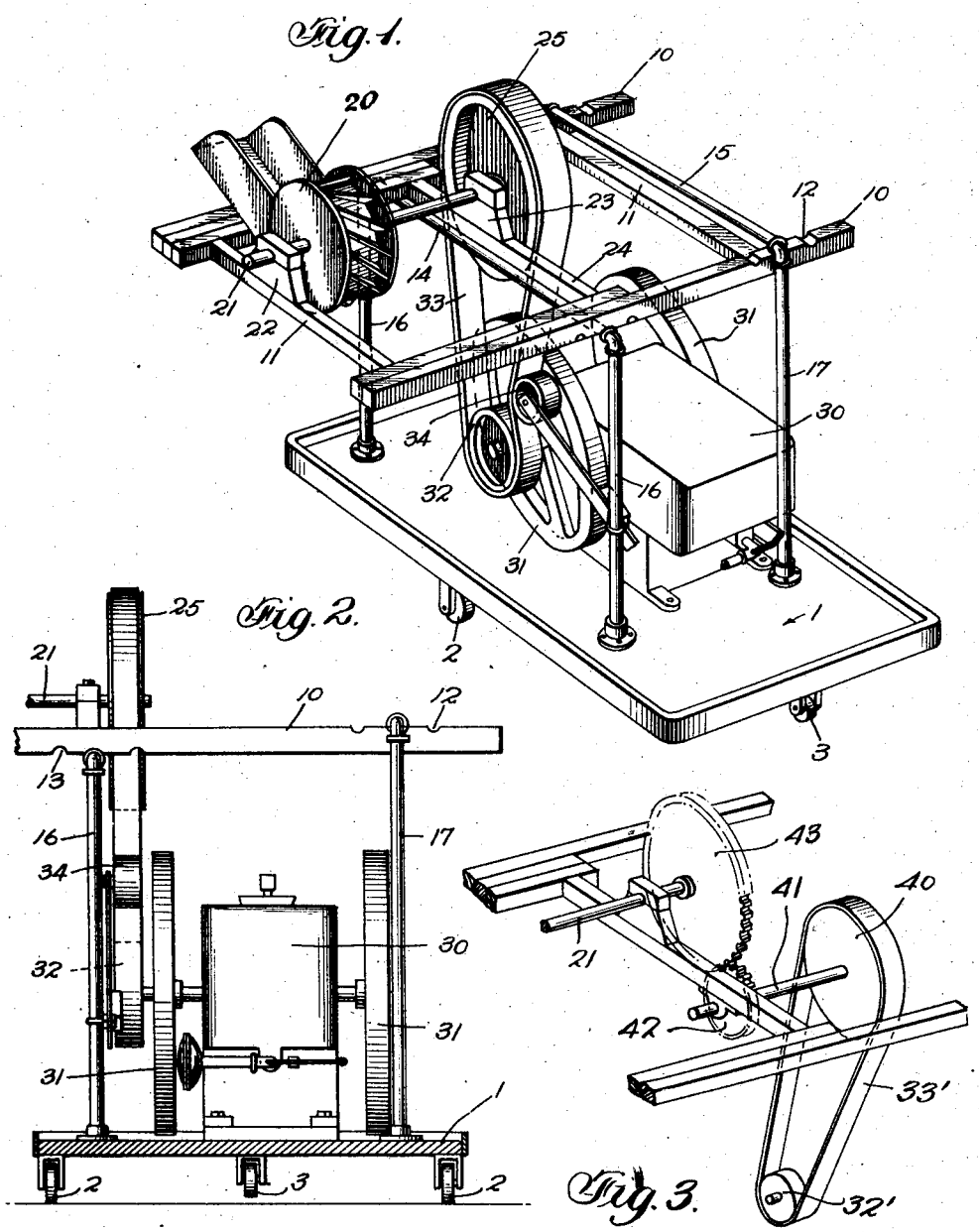

1,814,033

UNITED STATES PATENT OFFICE

RALPH W. HARRIS, OF CANEADEA, NEW YORK

APPARATUS FOR USE IN MILLING CURD

Application filed October 15, 1924. Serial No. 743,803.

The apparatus of invention comprises essentially a movable truck, a power plant of any desired kind carried on the truck, and a curd mill such as a Gosselin curd mill, carried on the truck. The apparatus is readily portable and carries its own power plant or engine. It therefore entirely does away with overhead shafting, pulleys and belting, and at the same time may readily be moved and placed in any desired position with relation to the sink. The apparatus may be moved back and forth along the sink, thereby making it unnecessary to move the sink, and lessening the distance that the curds need to be carried to the mill. The truck is provided with wheels of different diameters so that it may be tilted about a horizontal axis, a construction facilitating the ready maneuverability of the truck.

The power plant carried on the truck is preferably a gasoline engine of any desired type. The curd mill is supported overhanging the side of the truck, the supporting means comprising a frame for the curd mill and a pair of horizontally extending supporting arms carried by the truck, the side members of the curd mill frame engaging over and under these horizontally extending arms, whereby the curd mill is held in place by its own weight and whereby it may be readily removed for cleaning, etc., by simply lifting it.

Further details of the invention will be described in connection with the accompanying drawings illustrating, by way of example, one embodiment of the invention.

In these drawings,

Fig. 1 is a perspective view of the apparatus.

Fig. 2 is an end view, and

Fig. 3 is a perspective view of a slight modification.

Referring now to the drawings in which similar reference characters indicate similar parts, the apparatus comprises a platform 1 which is supported by a pair of oppositely disposed side wheels 2 and a second pair of oppositely disposed end wheels 3. One pair of wheels, such as the side wheels 2, is of larger diameter than the other pair of wheels so that the platform 1 may be tilted about a horizontal axis passing through the hubs of the wheels 2, 2, and thus may be readily turned about a vertical axis by turning it on the wheels 2.

The frame for the curd mill comprises a pair of side members 10 and a pair of end members 11 forming a substantially rectangular frame. The side members 10 are provided with a plurality of notches 12 at the upper side near one end thereof, and with a plurality of notches 13 on the underside thereof near the middle. These side members 10 engage detachably over a horizontally extending support 14 and under a horizontally extending support 15, the notches 12 and 13 fitting the respective supports. The supports 14 and 15 which are substantially parallel and extend in the direction of travel of the wheels, are preferably made of ordinary piping of an inch or so in diameter, and are supported on the platform 1 of the truck by vertical standards 16 and 17 of similar piping. As will be apparent from Fig. 2, the support 14 over which the frame of the curd mill engages, is slightly lower than the support 15 whereby the frame of the curd mill will be substantially horizontal.

The arms 10, which are well above the floor of the truck, extend laterally from the truck in a direction substantially at right angles to the direction of travel of the wheels of the truck.

The curd mill, here shown as a Gosselin curd mill, but which may be of any desired design, comprises a rotatable cutting member 20, carried on a shaft 21 supported in bearings 22 and 23, bearing 22 being supported on the frame member 11 of the curd mill frame and bearing 23 being supported on a similar member 24 of the frame. Mounted on one end of the shaft 21 is a belt wheel 25.

A suitable power plant is supported on the platform 1. This power plant may be of any desired type and is here shown as a gasoline engine 30 comprising a pair of fly wheels 31 and the driving pulley 32. An electric motor could be used instead of a gasoline engine. The engine is placed on the platform to keep the center of gravity of the apparatus low, and so that its weight is slightly to one side of a line drawn through the wheels 2 whereby the weight of the engine counterbalances the weight of the overhanging curd mill and also causes one of the wheels 3 to bear against the floor and thus prevents the truck moving too easily. The reaction of the engine as it explodes also causes one end of the truck to press against the floor. The power plant drives the curd mill substantially continuously.

A belt 33 passing around the pulley 32 and wheel 25 serves to drive the curd mill. A belt tightener 34 of any desired type is used to keep the belt taut.

A slight modification is shown in Fig. 3 where in case a motor or engine of low power is used, allowance is made therefor by suitable reduction gearing. This mechanism comprises a belt 33' driven by a drive pulley 32', the belt serving to drive the wheel 40 mounted on a short shaft 41 on which is carried a small gear 42 which meshes with a large gear 43 secured to the shaft 21 of the curd mill 20.

It will be noted that there is provided by this invention a readily maneuverable unit; by lifting on one end of the platform 1 the weight of the unit is carried on the wheels 2, whereby the apparatus may be turned about a vertical axis. It may be shoved along the sink, thereby making it unnecessary to move the sink. This is of distinct advantage, since the sink, when filled with curds, weighs something over 600 pounds. Furthermore, all overhead shafting and belts depending therefrom are eliminated. The curd mill overhangs at one side of the truck directly over the sink, the weight of the engine serving to stabilize the apparatus. The weight of the curd mill serves to keep it in place on the supports 14 and 15, and yet the mill may be readily removed for cleaning or repairs by simply disconnecting the belt and lifting it away from the supports 15 and 16.

While I have illustrated in some detail a preferred embodiment of my invention, it should be understood that the invention is not limited to these exact details, but may be carried out in other ways as expressed within the scope of the appended claims.

I claim as my invention:—

1. An apparatus for milling curd in the making of cheese, comprising a low hung wheeled truck, supporting means carried by the truck, well above the floor of the truck, extending laterally from the truck in a direction substantially at right angles to the path of travel of the wheels, a curd mill supported at the outer end of said supporting means to overhang a curd sink, and a power operated mechanism, connected to drive the curd mill and placed on the floor of the truck so as to counterbalance the weight of the overhanging curd mill, whereby the curd mill may be moved freely along the curd sink as it mills the curd.

2. An apparatus for milling curd in the making of cheese, comprising a low hung wheeled truck, a pair of horizontally extending substantially parallel supporting members supported well above the floor of the truck and extending in the direction of travel of the wheels of the truck, a pair of horizontally extending arms for supporting a curd mill, engageable over and under said supporting members and extending laterally from the truck in a direction substantially at right angles to the direction of travel of the wheels, the arms being readily detachable from the supporting members by lifting on outer ends of the arms, a curd mill carried at the outer ends of the arms in an overhanging position at the side of the truck, and a power operated mechanism, connected to drive the curd mill and placed on the floor of the truck, to counterbalance the effect of the laterally overhanging curd mill.

In testimony whereof I affix my signature.

RALPH W. HARRIS.